(12) United States Patent
Wu

(10) Patent No.: US 11,365,007 B2
(45) Date of Patent: Jun. 21, 2022

(54) SYSTEMS AND METHODS FOR PROVIDING A WAKE-UP USER INTERFACE FOR A NIGHT MODE ON TRANSPORTATION VEHICLES

(71) Applicant: Panasonic Avionics Corporation, Lake Forest, CA (US)

(72) Inventor: Eric H. Wu, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 433 days.

(21) Appl. No.: 16/663,265

(22) Filed: Oct. 24, 2019

(65) Prior Publication Data

US 2021/0122469 A1 Apr. 29, 2021

(51) Int. Cl.
| | | |
|---|---|---|
| *H04N 21/214* | (2011.01) | |
| *B64D 11/00* | (2006.01) | |
| *B64D 11/06* | (2006.01) | |
| *G06F 3/0346* | (2013.01) | |
| *G06F 3/04842* | (2022.01) | |
| *G09G 3/34* | (2006.01) | |
| *H04N 5/57* | (2006.01) | |

(52) U.S. Cl.
CPC .. *B64D 11/00155* (2014.12); *B64D 11/00153* (2014.12); *B64D 11/00154* (2014.12); *B64D 11/06* (2013.01); *G06F 3/0346* (2013.01); *G06F 3/04842* (2013.01); *G09G 3/34* (2013.01); *H04N 5/57* (2013.01); *H04N 21/2146* (2013.01)

(58) Field of Classification Search
CPC ......... H04N 21/2146; H04N 21/41422; H04N 21/4318; H04N 21/44218; H04N 21/4432; H04N 21/478; H04N 21/4854; G06F 3/0346; G06F 3/04842; G06F 3/012; G06F 3/013; B64D 11/00155; B64D 11/00153; B64D 11/00154; B64D 11/06

See application file for complete search history.

(56) References Cited

U.S. PATENT DOCUMENTS

| | | | | |
|---|---|---|---|---|
| 6,240,414 | B1 * | 5/2001 | Beizer | G06F 16/1787 |
| 7,836,472 | B2 * | 11/2010 | Brady, Jr. | H04N 21/2146 |
| | | | | 725/74 |
| 7,984,190 | B2 * | 7/2011 | Rhoads | H04L 67/327 |
| | | | | 709/248 |

(Continued)

FOREIGN PATENT DOCUMENTS

WO WO2017/089861 6/2017

*Primary Examiner* — Michael B. Pierorazio
(74) *Attorney, Agent, or Firm* — Klein, O'Neill & Singh, LLP

(57) ABSTRACT

Methods and systems are provided for a transportation vehicle. One method includes enabling by a processor, a night mode for a seat device of an in-flight entertainment system (IFE) on an aircraft based on a night mode trigger; displaying by the processor, during the night mode, a wake-up user interface on the seat device for a passenger, when a seat device monitor backlight has turned on after the backlight was turned off, or a seat device backlight timer has triggered, where a brightness of the wake-up user interface is lower than a brightness of a default user interface of the seat device; and enabling by the processor a first set of functions of the seat device accessible from the wake-up user interface, the first set of functions being less than a second set of functions accessible from the default user-interface.

20 Claims, 13 Drawing Sheets

(56) References Cited

U.S. PATENT DOCUMENTS

| | | | | |
|---|---|---|---|---|
| 8,176,363 B2* | 5/2012 | Zlotnick | G06F 11/2082 | 714/13 |
| 8,649,161 B2* | 2/2014 | Kato | H04N 21/41422 | 345/905 |
| 9,041,670 B2* | 5/2015 | Kobayashi | H04N 21/42208 | 345/173 |
| 9,083,581 B1* | 7/2015 | Addepalli | H04W 8/08 | |
| 9,094,539 B1* | 7/2015 | Noble | H04N 21/00 | |
| 9,226,000 B1* | 12/2015 | Knight | H04N 21/8352 | |
| 2006/0107295 A1* | 5/2006 | Margis | H04N 21/2665 | 348/E7.071 |
| 2006/0174285 A1* | 8/2006 | Brady | H04H 20/62 | 725/78 |
| 2007/0106771 A1* | 5/2007 | Lucash | H04L 67/1095 | 709/223 |
| 2007/0250873 A1* | 10/2007 | Ohyama | H04L 29/06027 | 725/74 |
| 2008/0016081 A1* | 1/2008 | MacMillan | G06F 16/951 | |
| 2008/0016196 A1* | 1/2008 | MacMillan | H04N 21/43615 | 709/223 |
| 2009/0077595 A1* | 3/2009 | Sizelove | G06F 1/1656 | 725/75 |
| 2009/0119721 A1* | 5/2009 | Perlman | H04N 7/24 | 725/75 |
| 2011/0167460 A1* | 7/2011 | Tranchina | H04N 21/4382 | 725/75 |
| 2012/0112694 A1* | 5/2012 | Frisch | B60L 53/11 | 320/109 |
| 2013/0066526 A1* | 3/2013 | Mondragon | G06V 40/20 | 701/49 |
| 2013/0093958 A1* | 4/2013 | Yoshikawa | H04N 21/41422 | 348/E5.057 |
| 2013/0144487 A1* | 6/2013 | Suzuki | G01C 21/3688 | 701/36 |
| 2014/0013364 A1* | 1/2014 | Vondoenhoff | H04N 21/2146 | 725/77 |
| 2014/0059184 A1* | 2/2014 | Bird | H04H 20/62 | 709/219 |
| 2014/0074918 A1* | 3/2014 | Wang | H04L 67/104 | 709/203 |
| 2014/0085337 A1 | 3/2014 | Velten et al. | | |
| 2014/0366125 A1* | 12/2014 | Murata | H04W 12/50 | 726/17 |
| 2015/0245109 A1* | 8/2015 | Couleaud | H04N 21/26291 | 725/77 |
| 2015/0334441 A1* | 11/2015 | Sukegawa | H04N 21/436 | 725/25 |
| 2016/0062327 A1 | 3/2016 | Fagan et al. | | |
| 2016/0117081 A1 | 4/2016 | Pujia | | |
| 2017/0272815 A1* | 9/2017 | Yan | H04N 21/4852 | |

* cited by examiner

SYSTEMS AND METHODS FOR PROVIDING A WAKE-UP USER INTERFACE FOR A NIGHT MODE ON TRANSPORTATION VEHICLES

TECHNICAL FIELD

The present disclosure relates to transportation vehicles in general, and more particularly, to providing a configurable, wake-up user interface for devices on transportation vehicles during a night mode.

BACKGROUND

Transportation vehicles, for example, aircraft, trains, buses, recreation vehicles, boats and other similar vehicles, use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

Such passenger-specific functional equipment may create ambient effects when used, for example, a device screen may create a light ambient effect. Such effects may not be much of a nuisance when passengers of a transportation vehicle are awake, but such effects may be a nuisance when passengers are asleep. For example, when an airline passenger wakes up during a flight, and turns on a seat device of the IFE system, the passenger may be disoriented and glare from the seat device may disturb other passengers in the vicinity. The nuisance may be a bigger challenge for transportation vehicles having long transport times, for example, during long flights.

Continuous efforts are being made to develop technology to improve travel experience by reducing effects of travel disorientation, while continuing to provide functionality to a passenger after the passenger wakes up on the transportation vehicle.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
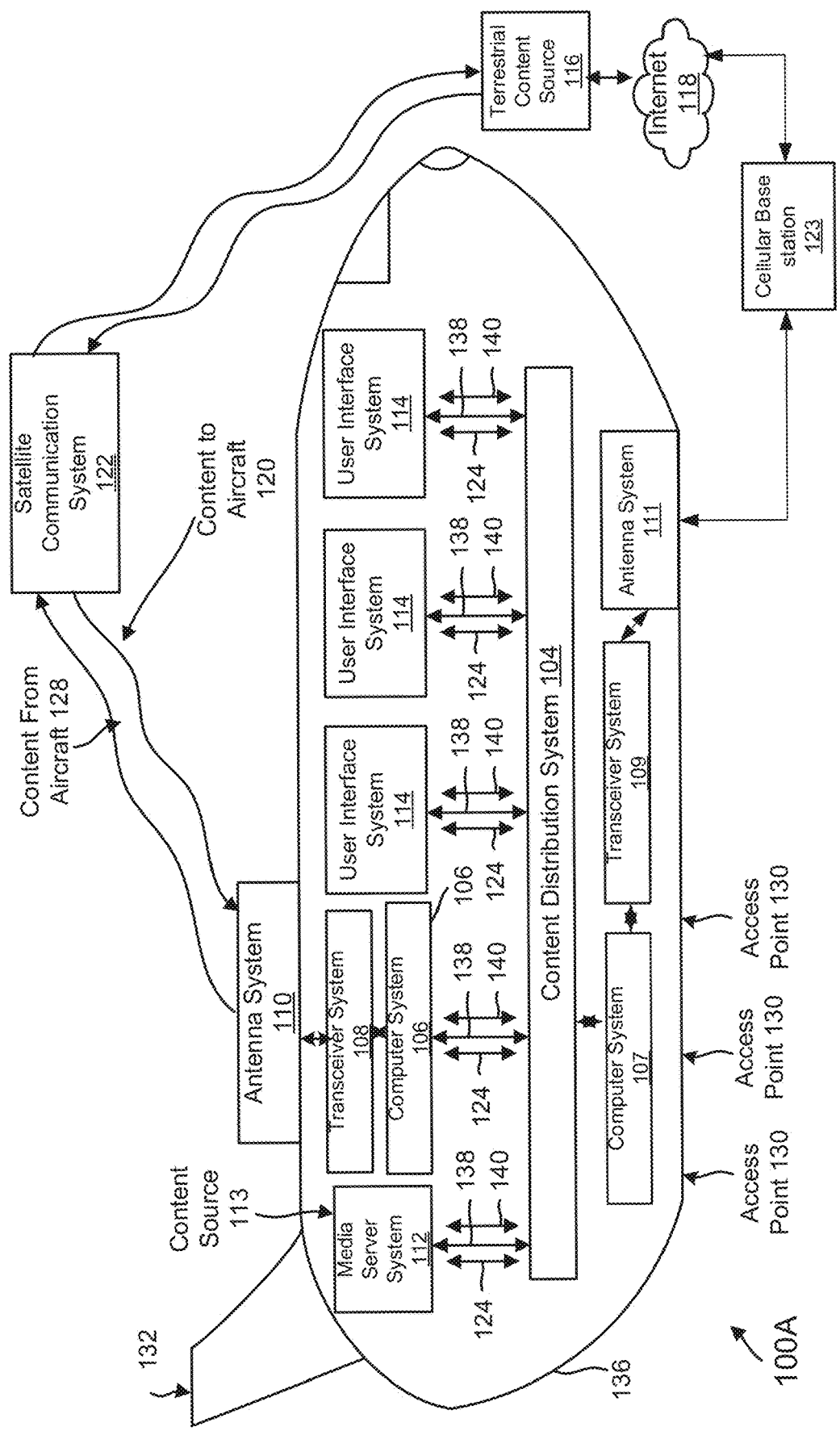
FIG. 1A shows an example of an operating environment for implementing the various aspects of the present disclosure on an aircraft.

The terms "component", "module", "system", and the like as used herein are intended to refer to a computer-related entity, for example, a software-executing processor, hardware, firmware or a combination thereof. For example, a component may be, but is not limited to being, a process running on a hardware processor, a hardware processor, an object, an executable, a thread of execution, a program, and/or a computer.

By way of illustration, an application running on a server and the server can be a component. One or more components may reside within a process and/or thread of execution, and a component may be localized on one computer and/or distributed between two or more computers. Also, these components can execute using one or more non-transitory, computer readable media having data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, a configurable/customizable, "wake-up screen" (also referred to interchangeably throughout this specification as a "wake-up interface" or a "wake-up user interface") is provided to an electronic device of an aircraft by an in-flight entertainment ("IFE") system to assist a passenger on an aircraft to wake up gently. The electronic device includes a seat device providing or interfacing with the IFE system, a Personal Electronic Device (PED) or any other device type. Such electronic devices are referred to herein as media client systems, media systems, media clients, user interface systems or simply media devices.

In one aspect, the wake-up screen is presented with dimmed brightness. The dimmed brightness is configurable by the passenger, for example, between 0-75% of the brightness level of a default interface (also referred to as "interactive") of the seat device. Using the wake-up screen with dimmed brightness, as described below in detail, the passenger can quickly access flight information, turn on/off an attendant call light, turn on/off an overhead light, turn-off a seat device back light, order food/drinks, or call a crew member, without having to use the default interface of the IFE system. The wake-up screen is advantageously used during a "night stage" of a flight, where the passenger has fallen asleep.

As an example, the wake-up screen is presented for a night mode. In one aspect, without limitation, the night mode may be triggered by a manual cabin interface from a crew member device ("trigger 1"), aircraft cabin light control messages ("trigger 2"), ambient light sensors at seat devices indicating that cabin lights within the aircraft have dimmed or are turned off ("trigger 3") or based on evaluation of images from a seat device camera that track passenger's eye, eyelid behavior, head position or any other data points, used collectively to determine that the passenger is asleep ("trigger 4"). It is noteworthy that the wake-up screen is presented during the night mode when a seat device backlight has turned on, after being turned off or if a backlight timer has triggered, as described below in detail.

In one aspect, the innovative wake-up screen disclosed herein enables the passenger to be gently woken up with access to limited functions, e.g. access to flight information (e.g. time to destination, time at origin, flight progress etc.), ability to turn on/off attendant call button, ability to turn on/off overhead light, ability to turn off backlight at a seat device, ability to order food/drinks, or ability to contact the crew with minimal light spill so that other passengers can stay asleep. Details regarding the computing technology for enabling the wake-up screen are provided below.

In another aspect, a multi-mode media system (e.g. an IFE system of an aircraft) enables a media device to switch between a default mode (may also be referred to as a day mode) and a night mode. While the media system is in the default mode, the media system may execute the default user interface on the media device for use by a passenger of a transportation vehicle (e.g. an aircraft, train, bus, ship or any other commercial transport). While the media system is in the night mode, the media system executes the wake-up user interface on the media device for use by a passenger of the transportation vehicle, which is configured to create fewer ambient effects than the default user interface. For example, the wake-up user interface has a lower, configurable brightness level (e.g. 10%) than the brightness of the default user interface, and fewer functional options than the default user interface. The wake-up user interface may also allow a passenger to execute the default user interface from the media device at any time.

In another aspect, the media system is configured with a sleep detection module to enable the night mode based on monitoring a passenger's eye, head position, eyelid behavior or any other parameter while the passenger is at a passenger seat. The sleep detection module deactivates the default user interface when it detects that the passenger has entered a sleep condition, for example, if the passenger has not provided an input to the default user interface within a threshold period of time, or if a sensor detects that the passenger's actions (e.g. passenger's head position, eye movement, and/or eyelid behavior) match a sleep signature in a data repository. Details regarding the use of the default mode, the night mode and the sleep detection module are provided below.

Vehicle Information System: FIG. 1A shows an example of a vehicle information system 100A (also referred to as system 100A) that can be configured for installation aboard an aircraft 132, according to one aspect of the present disclosure. In one aspect, as described below in detail, system 100A provides a plurality of media user interface systems 114 (may also be referred to as media client systems, media devices or media clients) for a plurality of passengers of the aircraft 132, to operate in a night mode and a default mode. As described below in detail, the night mode is configured to provide an innovative wake-up user interface on the user interface systems 114 that is designed to have less ambient effects than a default user interface of the user interface systems 114.

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) media client user interface systems (may also be referred to as a seat device/ seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The media server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120. The media server system 112 may stream and/or otherwise transmit data stored on the storage system to content distribution system 104 to be played by a passenger using user interface system 114.

For example, one type of content that may be transmitted to user interface system 114 comprises viewing content 124. The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a cellular base station 123 that communicates through an antenna 111 to a transceiver system 109 and a computer system 107. The functionality of computer system 107 is similar to computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as a network device that provides access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. Transceiver system 108 is preferably configured to both send and receive data to any suitable content source device. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interface systems 114 including an IFE or a PED, as desired. Although shown and described as being separate systems for purposes of illustration, the computer system 106 and the media server system 112 can be at least partially integrated, and in some aspects comprises a single computer system.

The user interface system 114 may comprise computing terminals in communication with an access point 130, for example, a port that user interface system 114 plugs into. The user interface system 114 provides a display device to view content, for example, a screen having a keyboard or a touchscreen. The screen may provide a default user interface or a wake-up user interface based on an operating mode, i.e. a default mode or a night mode, as described below in detail. It is noteworthy that when the night mode is disabled, the system automatically operates in the default mode. The user interface system 114 includes a hardware interface to connect to an access point 130 that provides a wired and/or a wireless connection for the user interface system 114 to interface with.

In at least one aspect, the user interface system 114 comprises a software application that a user downloads and installs on a PED to receive and view content via an access point 130, described below in detail. While bandwidth limitation issues may occur in a wired or wireless system on a vehicle, such as an aircraft 132, in general the system bus of the vehicle information 100A system is configured to have sufficient bandwidth to support data transfers for all user interface systems 114 aboard the vehicle, i.e., devices used by passengers.

The user interface system 114 can include an input system (not shown) for permitting the user (or passenger) to communicate with system 100A, such as via an exchange of control signals 138. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), a microphone for voice input, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
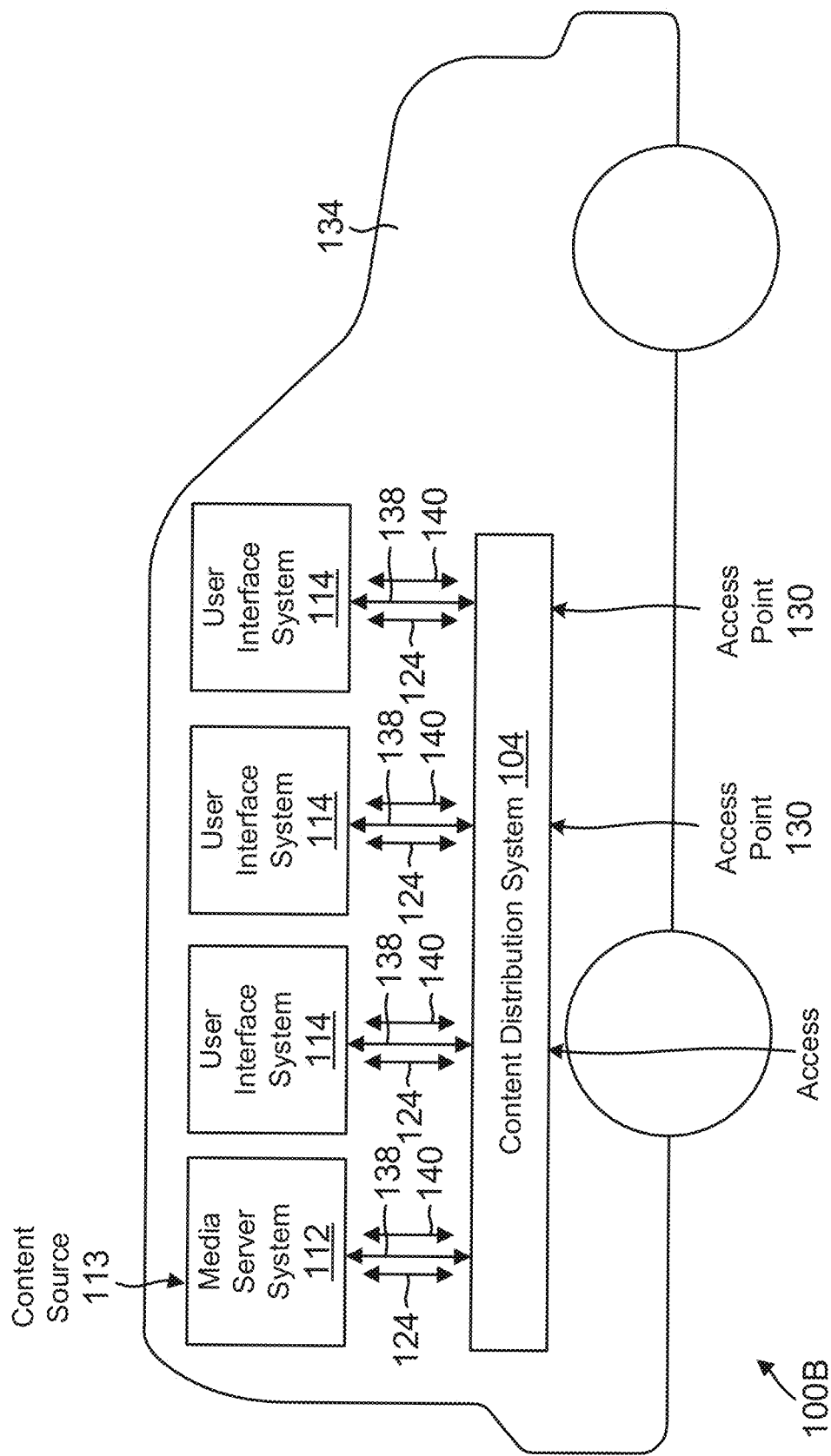
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
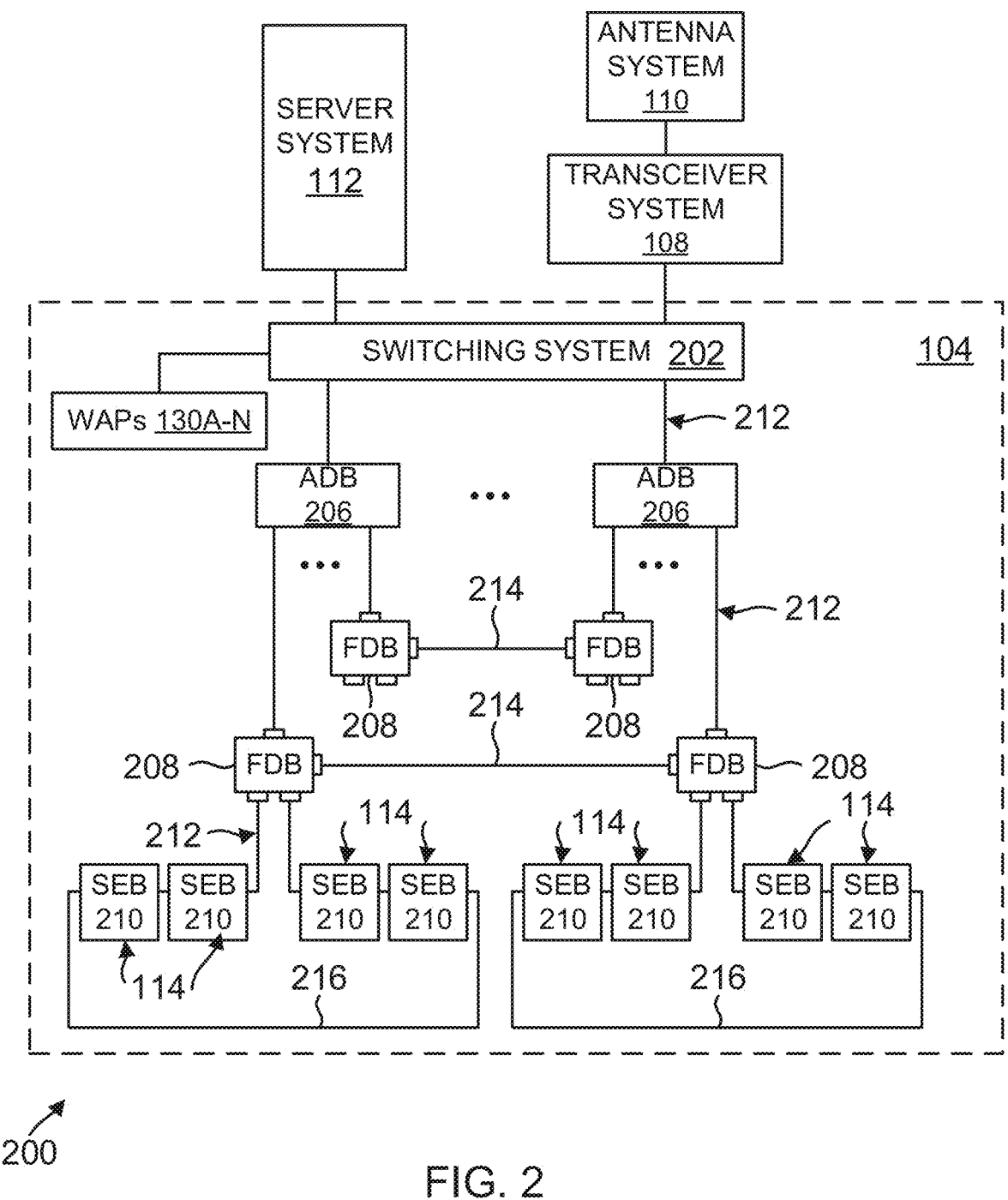
FIG. 2 shows an example of a content distribution system on an aircraft, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of media client systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. In some aspects, the content distribution system 104 may comprise a fiber optic network. To achieve high data transfer rates in a wireless communications environment, free-space optics (or laser) technology, millimeter wave (or microwave) technology, and/or Ultra-Wideband (UWB) technology can be utilized to support communications among the various system resources, as desired, for example, a 5G network.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or VSEBs and/or PSEBs) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more WAPs (130A to 130N) connected in communication with the switch system 202 for wireless distribution of content to user interface systems 114 including PEDs.

Each of the area distribution boxes 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface system 114. Each SEB 210 can support one or more of the user interface systems 114.

The switching systems 202, the ADBs 206, the FDBs 208, the SEBs (and/or VSEBs, and/or PSEBs) 210, the antenna system 110 (and/or 111, FIG. 1A), the transceiver system 108 (and/or 109, FIG. 1A), the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The content distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of SEBs 210 for a selected FDB 208 as shown in FIG. 2. Each SEB loopback connection 216 therefore forms a loopback path among the daisy-chained SEBs 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
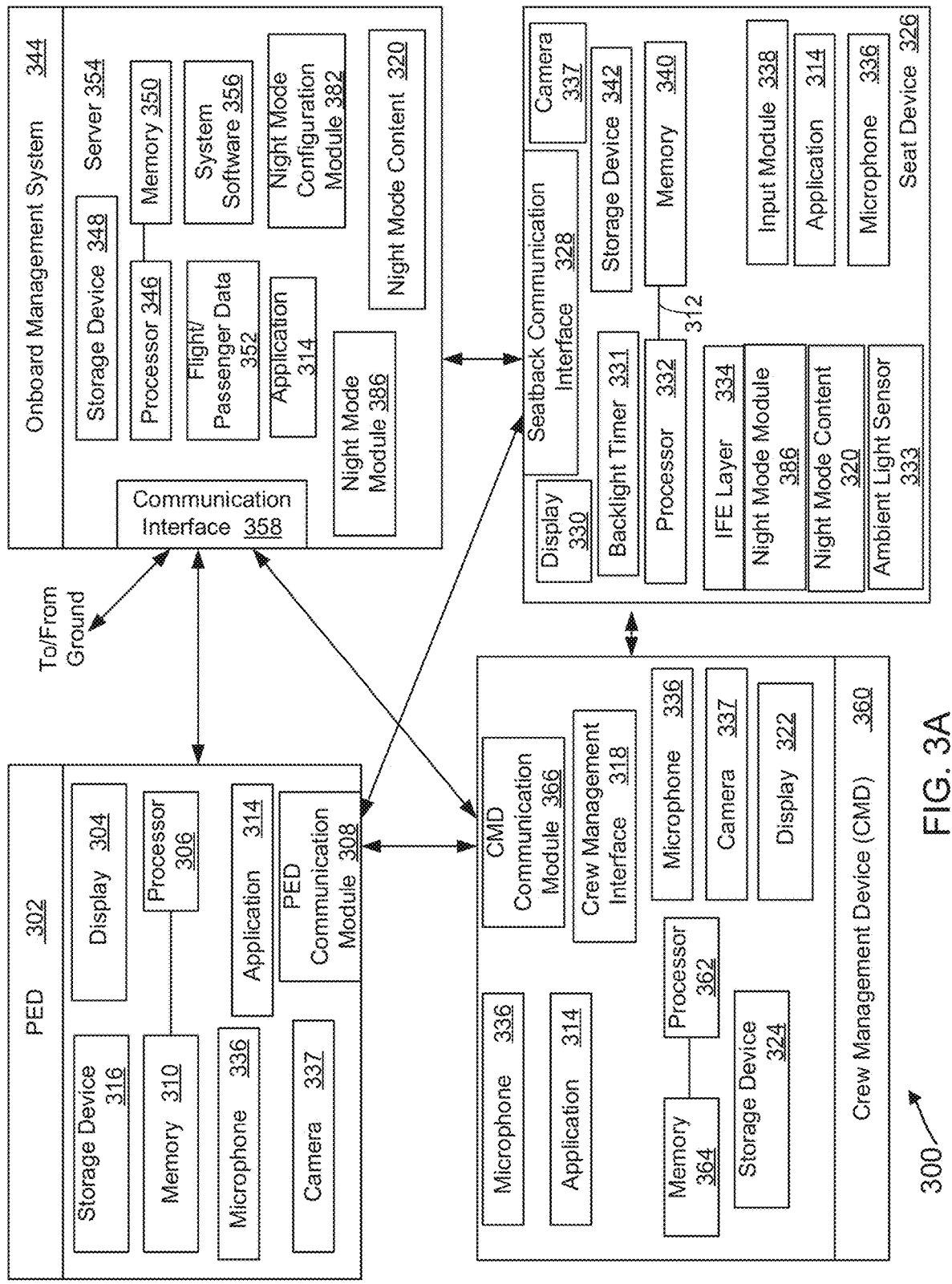
FIG. 3A shows an example of an overall system for a multi-mode media system on an aircraft, according to one aspect of the present disclosure.

System 300: FIG. 3A shows an example of a system 300 for an aircraft (or any other transportation vehicle including a train, a bus, a ship or any other commercial transportation vehicle) for providing a wake-up user interface during a night mode, according to one aspect of the present disclosure. In one aspect, System 300 includes a PED 302, an onboard management system 344, a crew management device (CMD) 360, and a seat device 326 configured to cooperate with one another to provide media content to a passenger. The passenger may consume media content via either seat device 326, for example, an IFE system or a touchscreen computer system, or may consume media content via PED 302, for example, a tablet computer system (or a mobile device) having an application 314 installed on the tablet computer system. In another aspect, system 300 may not include a seat device 326 or may not include a PED 302. The onboard management system 344 may be similar to computer systems 106/107 and/or server 112 described above with respect to FIGS. 1A/1B.

In one aspect, the seat device 326 includes a display device 330, an ambient light sensor 333, a backlight timer 331, a camera 337, a processor 332, a memory 340, a communication interface 328 and a local storage device 342 for storing content (e.g. night mode content 320). In some aspects, seat device 326 receives user input/requests via an input module 338. The input module 338 may be configured to use a local touch screen included with display 330, a local virtual keyboard, an external mouse, external keyboard and/or any other input device functionally connected to seat device 326.

Processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Processor 332 preferably executes one or more instructions saved on memory 340 to perform the functions described herein.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 is configured to execute an IFE layer 334 that provides in-flight entertainment and other options to passengers (e.g. controls for overhead light, interfacing with the crew, ordering food/drinks, and obtaining flight information). The IFE layer 334 provides audio/video content as well as controls for accessing the content. The IFE layer 334 uses the communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In one aspect, processor 332 is configured to execute a night mode module 386 (may also be referred to as module 386) that presents the night mode content 320 on display device 330 during a night mode. As an example, the night mode content 320 includes configurable media content for a wake-up user interface specific to the seat device 326. Details of using the night mode module 386 and night mode content 320 are provided below.

In one aspect, the night mode is triggered based on images captured by camera 337 to track passenger eye, passenger eyelid behavior and head position. These data points are collectively used to determine if a passenger is asleep to trigger the night mode.

In another aspect, the ambient sensor 333 detects ambient light around a passenger seat. When the ambient light is below a certain level, then the IFE system can conclude that either the cabin lighting has been dimmed or turned off. This information is used to trigger the night mode for seat device 326. It is noteworthy that although the ambient sensor 333 is shown separately it may be integrated with other components of the seat device 326, e.g. camera 337.

In yet another aspect, when the backlight timer 331 is triggered it indicates that a wake-up user interface is to be presented on seat device 326.

It is noteworthy that although the functional night mode module 386 is shown for clarity as a separate block, the functional processor executable instructions for the night mode module 386 may be embedded in the IFE layer 334 and/or application 314.

In one aspect, the seat device 326 may be part of the user interface system 114 or configured to interface with the user interface system 114 also described above with respect to FIGS. 1A/1B. It is noteworthy that the seat device 326 may be mounted on the back of a seat or supported from other structures, such as a bulkhead, wall, arm of a seat, etc. The adaptive aspects of the present disclosure are not limited to any specific location or orientation of the seat device 326.

In one aspect, the onboard management system 344 includes a server 354 (similar to, or comprising, the media server 112 and/or computer systems 106/107). The server 354 includes a processor 346 that has access to a memory 350 via a bus system/interconnect (similar to 312). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, night mode content 320 or a portion thereof, and other information) applications and program files, including system software 356, application 314, the night mode module 386, night mode configuration module 382 and others. While the night mode module 386 and night mode configuration module 382 are shown as a separate blocks, they may interface or may be included within system software 356 and/or application 314.

System software 356 of the onboard management system 344 is executed by the processor 346 to control the overall operation of the server 354. In some aspects, system software 356 may be configured to communicate with a PED, such as PED 302, to allow a passenger to download application 314 using an authorized PED 302 for accessing digital content.

In one aspect, the onboard management system 344 maintains flight and passenger data 352 (may be referred to as data 352), for example, flight itinerary including origin location, layover locations, destination location, language preference for translating messages from one language to another, arrival time and other information. Data 352 may also include passenger data that uniquely identifies each passenger for a flight using a unique identifier, a seat assigned to a passenger, a language preference for the passenger, and any other information that can uniquely identify the passengers (including a unique identifier of the PED 302). Data 352 may also include passenger profile information, such as a preferred meal or a preferred drink by a passenger, preferred music, preferred thematic selections, or other preferences specific to the passenger. Data 352 may be retrieved from an airline ground system before flight departure and may be updated during flight. In one aspect, data 352 is used to present content for a passenger at a wake-up user interface, as described below in detail.

In another aspect, processor 346 is configured to execute the night mode configuration module 382 out of memory 350. The night mode configuration module 382 transmits a command to some or all of the media devices functionally connected to server 354 via a communication interface 358. For example, when an airplane crew worker generates a command from CMD 360, to activate a night mode, disable a night mode or activate a default mode, the night mode configuration module 382 may then instruct media devices, such as seat device 326 and/or PED 302, to run in the selected mode. In another aspect, a command from a crew device activates a particular mode on a selected subset of the media devices connected to server 354, for example, only media devices in a business class cabin are activated.

In one aspect, the night mode content 320 includes media content for a media device, such as seat device 326 or PED 302. Such content may include, for example, a night mode background, a night mode screensaver, or a night mode media (e.g. a lullaby, a repetitive video or any other content type) that could play on the media device for a period of time. The night mode configuration module 382 may be configured to push some or all of the night mode content 320 to one or more media devices, such as seat device 326 and/or PED 302.

As an example, the night mode content 320 saved on server 354 is similar to the night mode content 320 on each seat device 326, but in other aspects the night mode content 320 saved on server 354 comprises night mode content for all media devices on the vehicle, and only a subset of that night mode content is pushed selectively to each media device, based on passenger profile information stored in passenger data 352. For example, passenger data 352 may have a profile for a first passenger that prefers lullaby night mode content, while a second passenger prefers a counting sheep night mode content. The night mode configuration module 382 selects a lullaby song as media content for the first passenger's media device and a counting sheep video as media content for the second passenger's media device by default, and transmits the selected media content to the media devices associated with the respective passengers.

In one aspect, server 354 communicates with CMD 360, PED 302 and/or seat device 326 via the communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In one aspect, PED 302 may be a mobile phone, a notebook, a tablet, a laptop or any other computing device. PED 302 may include a processor 306 that has access to a memory 310 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving a voice input from a passenger. The voice input can be converted into text by application 314. In another aspect, PED 302 includes a camera 337 that may be used by a passenger to upload digital images or take passenger images to determine if the passenger is asleep.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302. In one aspect, display 304 may include a touch screen for receiving input commands.

The storage device 316 may also store the application 314 that is executed by processor 306 out of memory 310. Application 314 may be used to pair the PED 302 with an aircraft system (for example, the IFE system) to receive content and communicate with aircraft crew.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, application 314 executed from PED 302 comprises a night mode module and night mode content similar to the night mode module 386 executed by the seat device 326 and the night mode content 320 stored by the seat device 326, whereas in other aspects application 314 saved on PED 302 does not comprise the night mode module or store the night mode content. In such aspects, while PED 302 may play the same or similar media data as seat device 326, only seat device 326 uses the night mode with a wake-up user interface, while PED 302 only provides a default user interface.

In one aspect, PED 302 uses a PED communication module 308 to communicate with the seat device 326, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In another aspect, CMD 360 may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a microphone 336 for receiving a voice input. CMD 360 may also include a display 322 to display information. Display 322 may also include a touch screen for receiving input commands. Display 322 may also be used to receive messages from passengers.

The CMD 360 includes a storage device 324 that may be, or may include any storage medium for storing data in a non-volatile manner, such as one or more magnetic or optical based disks, flash memory, or solid-state drive. The storage device 316 may be used to store a crew management interface (CMI) 318 that may be executed out of memory 364.

The CMI 318 enables the CMD 360 to interface with the onboard management system 344 via a CMD communication module 366. The CMD 360 may present one or more APIs to the on-board management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326 (e.g. to initiate a night mode), when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In one aspect, a mode change for a media device, such as seat device 326 or PED 302, may be triggered in a plurality of ways. For example, CMD 360 may include a switch or some other user interface that flight crew staff use to send a command to seat device 326 to change a device mode (e.g. default mode to night mode, or night mode to default mode). As an example, only one airplane crew terminal may be configured to alter device modes, however in some aspects, multiple airplane crew terminals are configured to allow device modes to be changed.

In some aspects, a switch intercept is installed on the aircraft, to trigger a device mode change. For example, a switch intercept may be functionally coupled to a light switch on the aircraft, which changes all, or selected, media devices on the aircraft to night mode when the main cabin lights are switched off, and changes all, or selected, media devices on the aircraft to default mode when the main cabin lights are switched on.

In some aspects, a sensor triggers one or more media devices to change mode, such as an ambient light sensor installed in the cabin (not shown). Data from the ambient light sensor may be sent to the onboard management system 344, which generates commands to change device modes of one or more media devices based upon the detected ambient light. For example, when an amount of a detected amount of ambient light falls below a given threshold, onboard management system 344 may be configured to change all, or a selected subset, of media devices to a night mode, and vice-versa, when the detected amount of ambient light is above a given threshold.

In another aspect, each media device may have its own sensors to change modes. For example, the seat device 326 and/or the PED 302 include an ambient light sensor 333 that switches the seat device 326 and/or the PED 302 between modes based upon the detected amount of ambient light.

In other aspects, the seat device 326 and/or the PED 302 use the camera 337 to record passenger movement, passenger eye, passenger eyelid behavior, and/or passenger head position, and compares passenger images to one or more sleep signature patterns stored on storage device 342 (or storage device 316 for PED 302). If the night mode module 386 detects that one or more images of the passenger match a sleep signature, then the night mode is triggered for provding a wake-up user interface. If module 386 detects a threshold amount of movement, or detects that one or more images of the passenger no longer matches a sleep signature, or detects that one or more images of the passenger matches an "awake" signature, then the night mode is changed to the default mode. Any combination of the above triggers may be implemented on a vehicle to initiate switching from one mode to another mode.

It is noteworthy that the various adaptive aspects described herein are not limited to the physical location for executing the night mode module 386 or where the night mode content 320 is stored. Furthermore, although system 300 includes the onboard management system 344, other configurations, e.g., in a server-less configuration, night mode module 386 may be executed only from seat device 326, CMD 360 and/or PED 302.

Figure 3B:
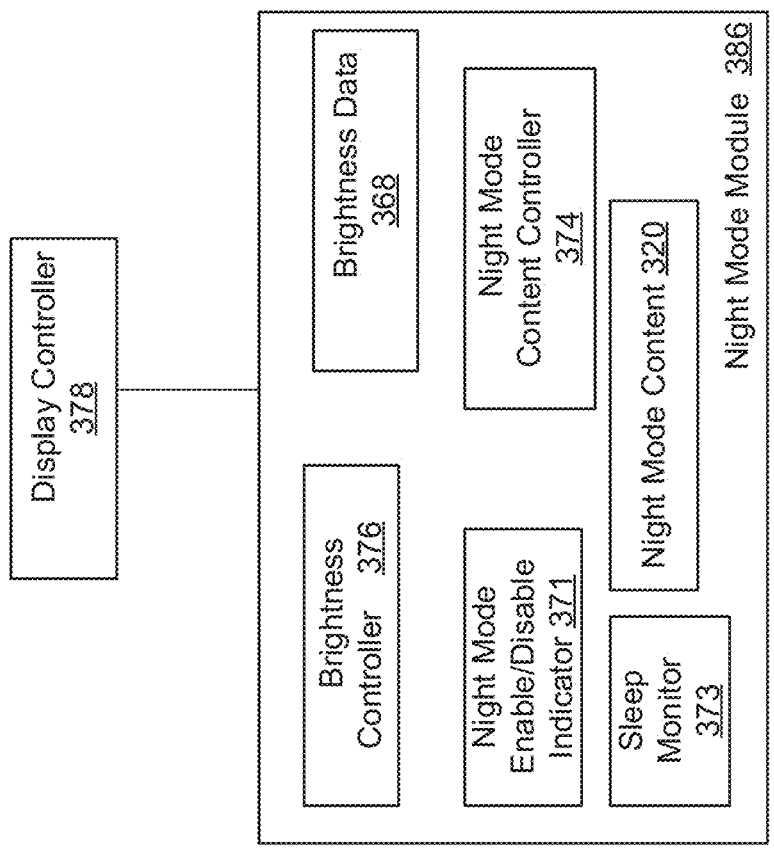
FIG. 3B shows a block diagram of a multi-mode media system, according to one aspect of the present disclosure.

Night Mode Module 386: FIG. 3B shows a functional block diagram of the night mode module 386, according to one aspect of the present disclosure. Night mode module 386 comprises a sleep monitor (may also be referred to as sleep detection module) 373, a brightness controller 376, brightness data settings 368, an indicator 371 that indicates whether night mode is enabled or disabled, a night mode content controller 374, and the night mode content 320. Night mode module 386 sends commands to display controller 378 to present a user interface to a media device, based on a selected night mode or the default mode.

Night mode enable/disable indicator 371 comprises a flag that indicates whether or not a night mode has been enabled on the media device. When the night mode is disabled, the default mode is automatically triggered. As stated above, the trigger for enabling/disabling a night mode on a media device may comprise any suitable trigger, either on the media device or on a remote device functionally connected to the media device.

When the night mode is not enabled, the display controller 378 displays a default user interface on the media device, for example, using the IFE layer 334 or the application 314 shown in FIG. 3A and described above.

When the night mode is enabled, the night mode content controller 374 provides input to the display controller 378 to minimize ambient effects and minimize disturbances to other passengers of the vehicle by using a configurable, dimmed brightness and providing limited functionality of a wake-up user interface.

As used throughout this specification, a default user interface (or default interface) for a default mode comprises a user interface of a media device that is different from the wake-up user interface. In some aspects, the default user interface may be a menu screen of a media device that a passenger may use to select different types of media to interact with. In other aspects, the default user interface may be a saved state of the media device that the last user of the media device was viewing, such as a paused video playing on the media device, or a map showing the location of the vehicle.

In some aspects, night mode content controller 374 alters the manner in which the media device powers up. For example, when the media device receives a command to power up (e.g. from a passenger touching a touch screen or a flight attendant sending a power-up signal to the media device from CMD 360), the night mode content controller 374 detects that the night mode indicator 371 is enabled, and may then display a wake-up user interface via display controller 378. The content for the wake-up user interface may be included in the night mode content 320.

Generally, any visual content would be displayed at a brightness level determined by brightness controller 376. Brightness controller 376 may set the brightness of the wake-up user interface to a static value, for example, 10% or 20% of the maximum brightness of the media device, or may set the brightness of the wake-up user interface to a configured, user-defined value, for example, between 0 to 75% of the brightness level of the default user interface of the media device. The brightness level of the default user interface and the wake-up user interface may be saved in brightness data 368.

By presenting a wake-up user interface having a lower brightness level than the brightness level of the default user interface, the wake-up user interface emits less ambient effects that could disturb other passengers. Other ambient effects of the wake-up user interface may also be muted, for example, a volume or a maximum volume may be decreased for the wake-up user interface.

In some aspects, the night mode content controller 374 monitors a passenger using the sleep monitor 373. Sleep monitor 373 monitors a passenger using one or more sensors 333 of the media device. In some aspects, the sleep monitor 373 monitors an input to the default user interface, such as a touch screen and/or a remote control. Sleep monitor 373 may log the last time the passenger provided an input to the user interface, and shuts off the default user interface when a threshold period of time between inputs has passed. In other aspects, sleep monitor 373 saves the state of the default user interface before shutting off the default user interface, allowing the passenger to return to a previous saved state upon startup of the media device.

In yet other aspects, the sleep monitor 373 monitors other sensors, for example, camera 337 on a media device that records passenger images. The camera detects a sleep condition, for example, when a passenger whose images match a sleep signature, or a passenger whose images match an away from seat signature, which may trigger a shutdown of the default user interface. Such signatures are preferably saved on a storage space of the media device for comparison, but may be saved on a remote device that compares the recorded image signature to saved image signatures.

By configuring the night mode content controller 374 to shut down the default user interface when a sleep condition is detected, the media device reduces ambient effects being emitted by the media device when it is in the night mode. When the passenger wishes to use the media device again, the passenger may send a power-up command to the media device (e.g. touching a touch screen), which initializes a wake-up user interface, preferably with a lower brightness than the default user interface. The wake-up user interface preferably comprises a method for a passenger to execute a default user interface, for example, a button on a touch screen that executes the default user interface when a user swipes or taps the button. In some aspects where a state of the default user interface is saved before shut-down, the default user interface may be executed using the saved state.

While the wake-up user interface enables a user to execute the default user interface, for example, to watch a previously played movie or to play a previously played song, the wake-up user interface preferably also enables limited functionality of the default user interface (i.e. a subset of functionality available from the default user interface is made available via the wake-up user interface). For example, the wake-up user interface may include a button on a touch screen that allows a user to order a drink and/or food, a button on a touch screen that allows a user to turn on an air vent above the user seat to a selected value, a button on a touch screen to turn on/off attendant light, a button on a touch screen to turn on/off overhead light, a button on a touch screen to turn off backlight of the seat device and provide flight information.

In some aspects, the limited functionality enabled on the wake-up user interface is selected based on a profile of the passenger, for example, stored at passenger data 352. This limited functionality may be determined by the night mode content controller 374 sending a query to the onboard management system 344 to determine the limited functionality, or determined by a remote application, such as night mode configuration module 382 on onboard management system 344, which pushes night mode content 320 to the media device.

Figure 3C:
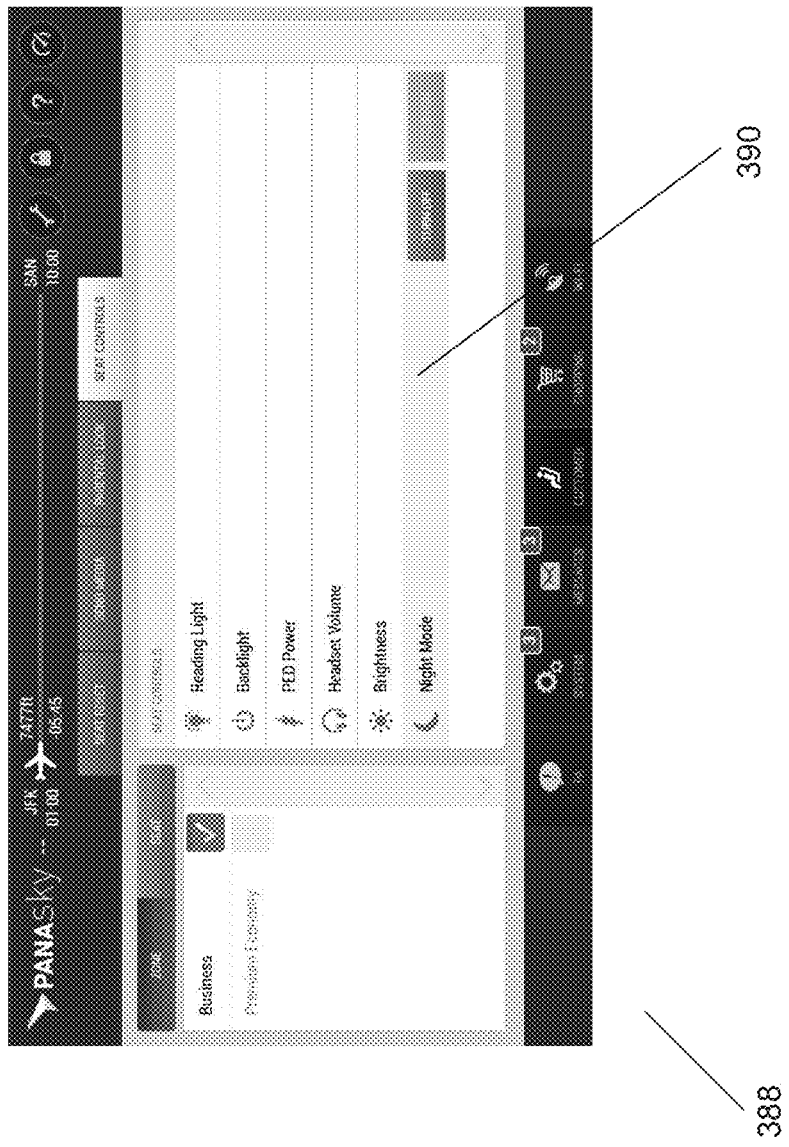
FIG. 3C shows an example of a graphical user interface used by a crew member to an enable/disable a night mode on an aircraft, according to one aspect of the present disclosure.

FIG. 3C shows an example of a graphical user interface ("GUI") 388 that may be presented on display 322 of CMD 360. GUI 388 may be presented by CMI 318. GUI 388 includes a selectable option 390, which is selected by an authorized crew member to enable and disable the night mode. This is referred to as trigger 1 above. It is noteworthy that when the night mode is disabled, the default is mode is automatically triggered. As described above, other night mode triggers include trigger 2 implemented by receiving an aircraft cabin light control message indicating that the cabin lights have dimmed or have turned off; trigger 3, implemented by one or more ambient light sensors at the seat device 326 (or any other location) indicating that the cabin lights have been dimmed or have turned off; and trigger 4, where a seat device camera 337 tracks passenger's eye, eyelid behavior, head position or other data points to determine if the passenger has fallen asleep. It is noteworthy that the various adaptive aspects of the present disclosure are not limited to any particular trigger that is used to enable a night mode.

Figure 3D:
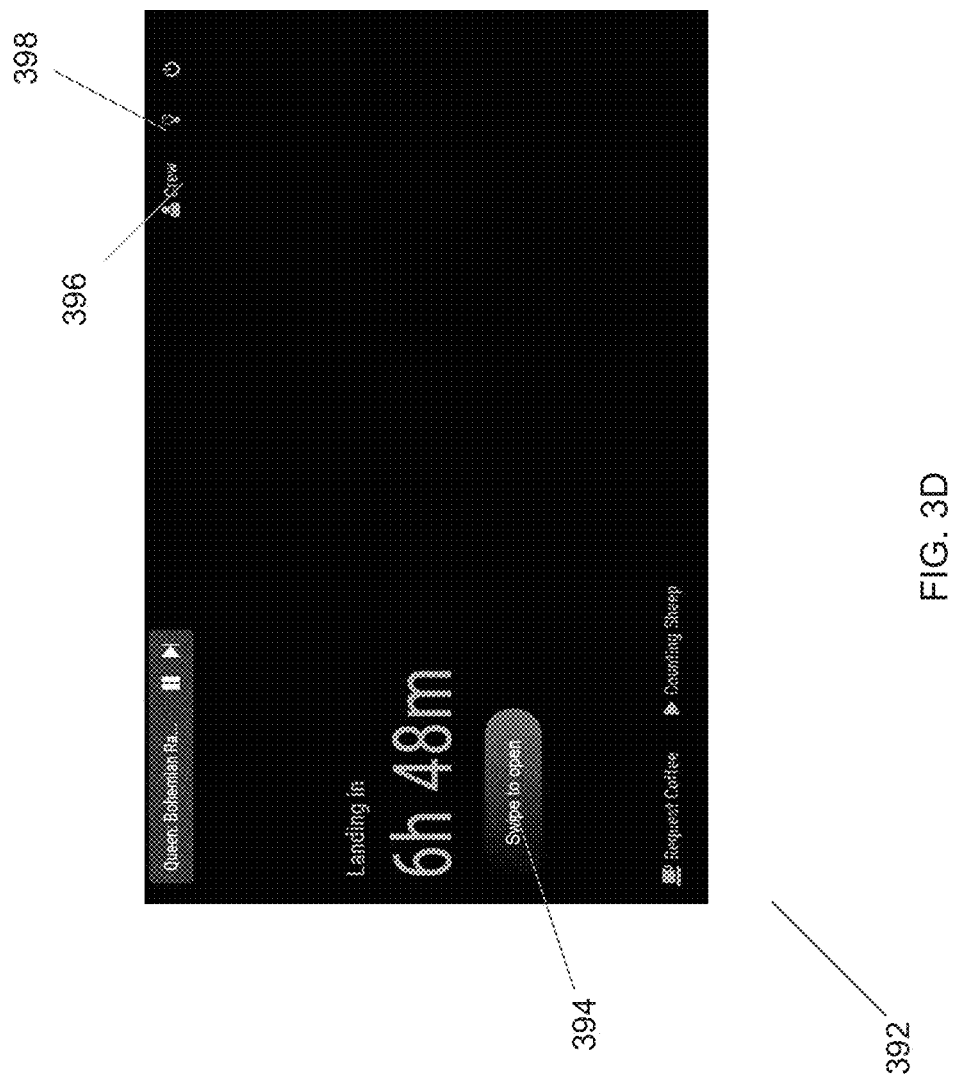
FIG. 3D shows an example of a wake-up screen presented during a night mode on an aircraft device, according to one aspect of the present disclosure.

FIG. 3D shows an example of a configurable wake-up user interface (or wake-up screen) 392, after a passenger has woken up. The wake-up user interface 392 is presented when a seat device display 330 backlight has turned on after being turned off (e.g. by touching a touch screen or a handset (not shown)) or a backlight timer 331 has been triggered.

The wake-up user interface 392 enables passengers to wake up gently during the night stages of a flight with reduced or dimmed brightness (e.g. 10% of the default brightness) that does not disturb other passengers. It is noteworthy that a passenger may configure the brightness level within a specified range, e.g. 0 to 75% of the available brightness level. Furthermore, the wake-up user interface 392 reduces passenger disorientation and hence improves overall customer travel experience.

In another aspect, the wake-up user interface 392 provides limited functionality to the passenger who has just woken up. For example, without limitation, the wake-up user interface 392 provides the time to destination shown as 6 h and 48 minutes, "request coffee", contact a crew member (via option 396), turn on/off an overhead light (via option 398), option to turn-off a backlight and play a media file shown as "counting sheep". The wake-up user interface 392 also enables the passenger to return to a default state using the "swipe to open" option 394.

In one aspect, the wake-up user interface 392 is triggered when the night mode is enabled based on one or more triggers described above and a backlight of display 330 has been turned on after being turned off, or if a backlight timer 331 has triggered. For the night mode, the passenger is provided an option to set a configurable brightness for the wake-up user interface, e.g. between 0-75%. While in the night node, the wake-up user interface 392 provides the passenger with an option to turn on/off the attendant call light, turn on/off the overhead light, turn off the backlight, order food and drinks, continue to the default, interactive screen of the IFE system, and provides flight information (time to destination, time at origin, flight progress indicator or any other flight related information). Process flow details for presenting the wake-up interface 392 are provided below.

Figure 4A:
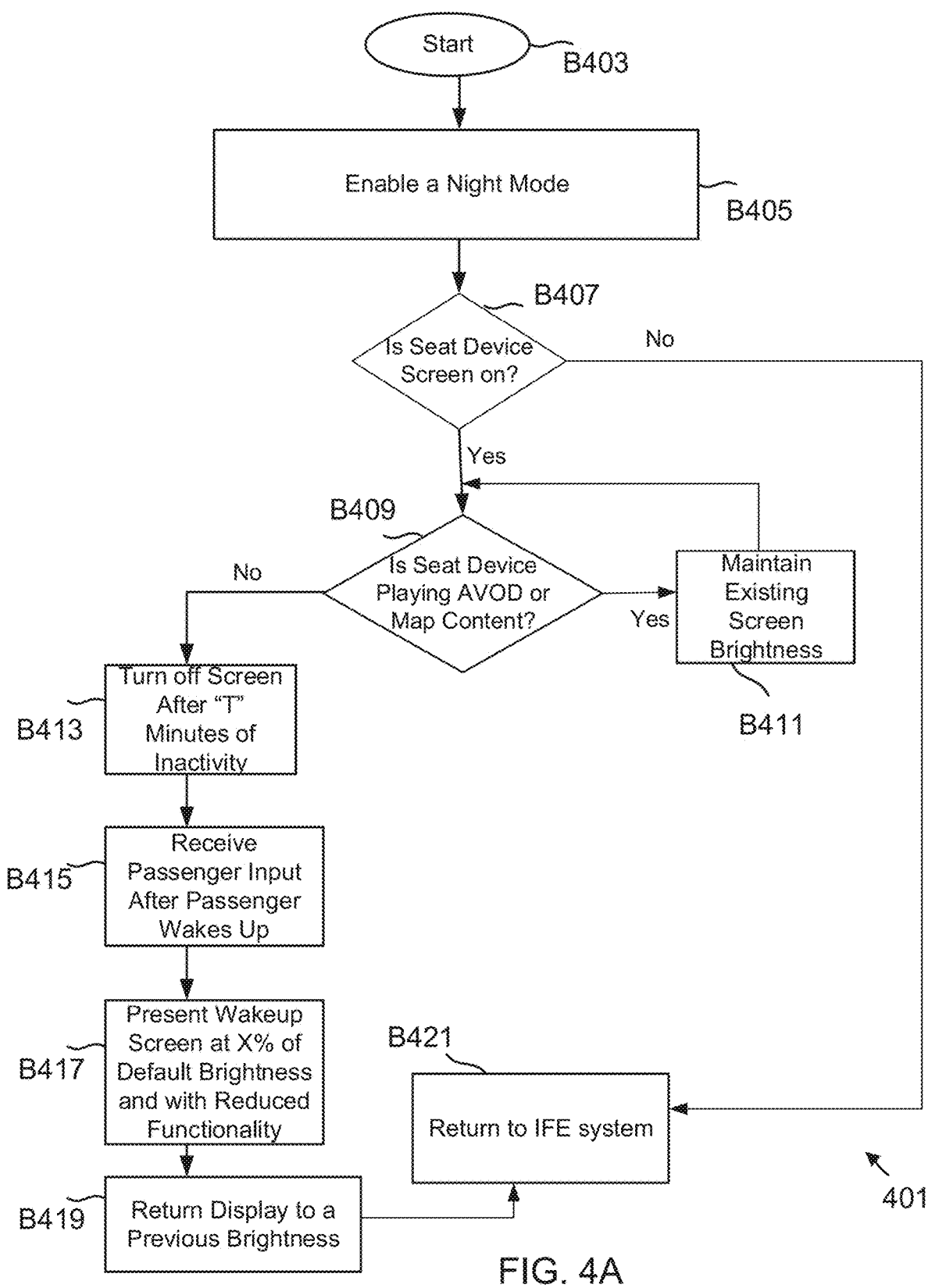
FIG. 4A shows a process for presenting a wake-up user interface for an in-flight entertainment (IFE) system, according to one aspect of the present disclosure.

Process Flow: FIG. 4A shows a process 401 for enabling a wake-up user interface (e.g. 392, FIG. 3D), according to one aspect of the present disclosure. The process blocks of FIG. 4A are described with respect to an IFE system of an aircraft but are equally applicable to any transportation vehicle type. Process 401 begins in block B403, when an aircraft is operational and preferably in-flight.

In block B405, a night mode on the aircraft is enabled by a night mode trigger. The night mode may be enabled for the entire aircraft or a portion thereof. The night mode may be triggered by a manual cabin interface from a crew device (360), an aircraft cabin light control message, an ambient light sensor 333 indicating that cabin lights within the aircraft have dimmed or based on images from a seat device camera 337 that tracks a passenger's eye, eyelid behavior, head position or any other data points, collectively to determine that the passenger is asleep, as described above in detail.

In block B407, the process determines if display 330 at a seat device 326 is on i.e. whether the default user-interface is on. If not, the process moves to block B421 described below. If the display 330 is on, the process determines whether the seat device 326 is showing audio-video content or flight information. If yes, then in block B411, a current brightness level (e.g. 75%) of the display 330 of the seat device 326 is maintained. If not, then in block B413, the display screen 330 of seat device 326 is turned off after a certain duration of inactivity, e.g. 20 minutes.

In block B415, a passenger input is received by the seat device 326, after the passenger wakes up. In block B417, a wake-up user interface (e.g. wake-up screen 392, FIG. 3D) is presented on seat device 326 for the night node. The brightness of the wake-up user interface is configurable by the passenger, e.g. between 0-75%. The wake-up user interface 392 also provides reduced functionality to the passenger, e.g. an option to turn on/off the attendant call light, turn on/off the overhead light, turn off the backlight, order food and drinks, continue to the default interactive screen of the IFE system, or provide flight information (e.g. time to destination, time at origin, flight progress indicator or any other flight related information). In one aspect, the limited functionality for a seat device is customized based on passenger profile stored at passenger data 352.

In block B419, optionally, the seat device display returns to a previous brightness level based on the stored brightness data 368 (FIG. 3B). In block B421, the passenger may elect to return to the default state of the IFE system i.e. using the default user interface.

In one aspect, the wake-up user interface of the present disclosure transforms in-flight experience by reducing the effects of disorientation upon waking up. Passengers are provided with a screen with limited functions and with minimal light spill that does not disturb other passengers while they are asleep.

Figure 4B:
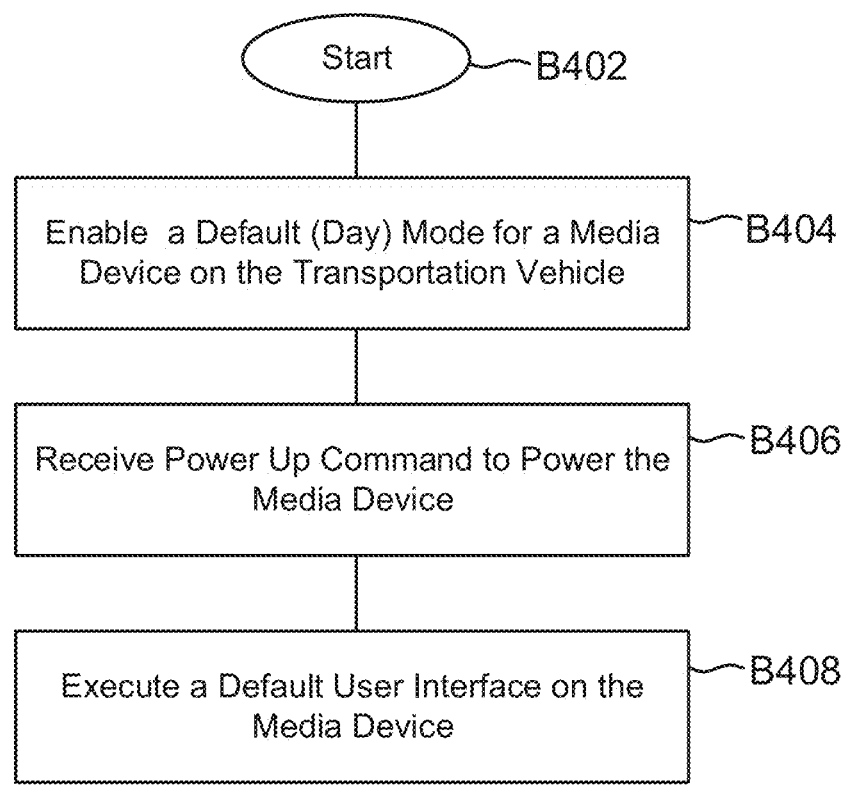
FIG. 4B shows a process flow diagram for a multi-mode media system for a default mode, according to one aspect of the present disclosure.

FIG. 4B shows a process 400 according to one aspect of the present disclosure. Although the process blocks of process 400 are described with respect to an aircraft, the innovative technology enabling the process blocks may be implemented on any transportation vehicle type. In the process 400, the media device in question is powered off. The process begins in block B402.

In block B404, default mode for the aircraft is enabled, for example, when a night mode is disabled, or by receiving a default mode command (or a "wake command") from an airplane crew terminal interface, a switch intercept interface, an ambient light sensor interface, or a sleep analytics interface (e.g. sleep monitor 373). The default mode command is transmitted to a media device, which is then set to the default mode.

In block B406, the media device receives a power-up command from a passenger at some point during the flight. Since the media device is set to a default mode, the media device then executes the default user interface on the media device in block B408. In some aspects, the default user interface comprises a startup sequence and menu that enables a passenger to select media to interact with. In other aspects, the default user interface will comprise a saved state that is saved on a memory of the media device, such as a paused movie or a map of the vehicle's journey.

Figure 4C:
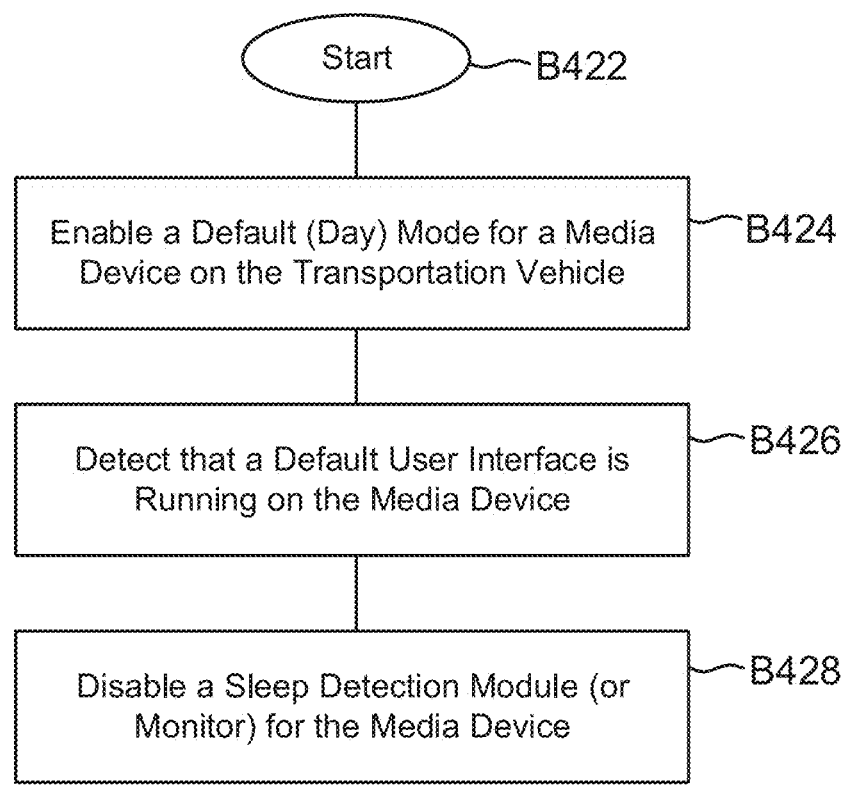
FIG. 4C shows another process flow diagram for multi-mode media system for the default mode, according to another aspect of the present disclosure.

FIG. 4C shows a process 420, according to another aspect of the present disclosure. Although the process blocks of process 420 are described with respect to an aircraft, the innovative technology enabling the process blocks may be implemented on any transportation vehicle type. In process 420, the media device in question is powered on and in use. The process begins in block B422.

In block B424, a default mode for the aircraft is enabled, for example, by disabling a night mode, or by receiving a default mode command (or a wake command) from an airplane crew terminal interface, a switch intercept interface, an ambient light sensor interface, or a sleep analytics interface (e.g. sleep monitor 373). The default mode command is transmitted to a media device (e.g. seat device 326, PED 302 or any other media device), which is then set to the default mode.

In block B426, the media device detects that the default user interface is being executed, and in block B428, the media device disables a sleep monitor 373 running on the media device. This prevents the media device from shutting off the default user interface when a sleep condition may occur or be detected by the media device.

Figure 4D:
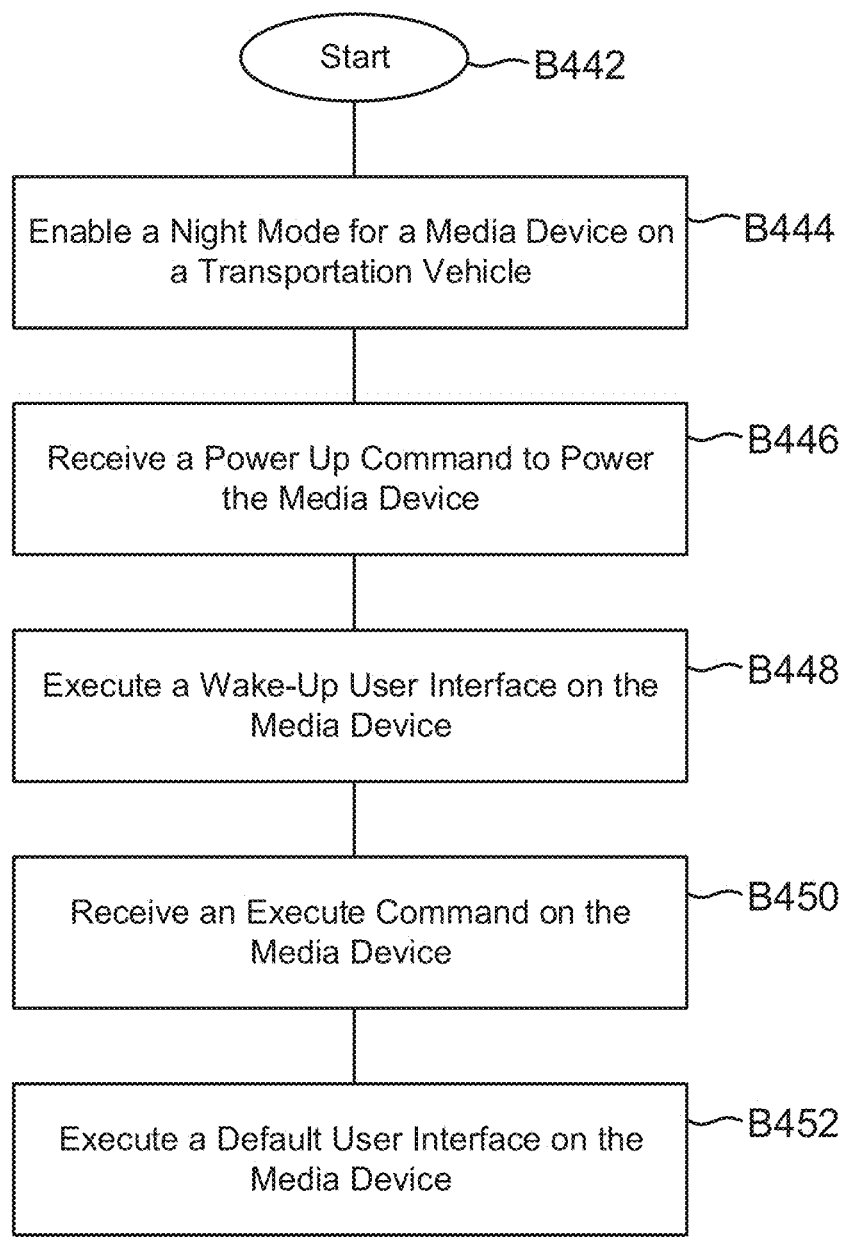
FIG. 4D shows a process flow diagram for multi-mode media system in a night mode, according to one aspect of the present disclosure.

FIG. 4D shows a process 440, according to another aspect of the present disclosure. Although the process blocks of process 440 are described with respect to an aircraft, the innovative technology enabling the process blocks may be implemented on any transportation vehicle type. In this process, the media device in question is not powered on. The process begins in block B442.

In block B444, a night mode for an aircraft or a portion thereof, is enabled, for example, by receiving a command (may be referred to as a "sleep command" or a "night mode command")) from an airplane crew terminal interface, a switch intercept interface, an ambient light sensor interface, or a sleep analytics interface (e.g. sleep monitor 373) that detects that a passenger is asleep. The night mode command is transmitted to a media device, which is then set to a night mode, preferably using a night mode indicator 371.

In block B446, the media device receives a power-up command from a passenger, which causes the media device to execute the wake-up user interface on the media device in block B448. This wake-up user interface is configured to minimize ambient effects as compared to the default user interface. The passenger may interact with the wake-up user interface, to perform certain tasks, for example, turn on/off attendant call light, turn on/off overhead light, turn off backlight, order a drink and/or food, obtain flight information (e.g. flight to destination, time at origin, flight progress or any other flight data) or to play lullaby music to help the passenger sleep. In some aspects, the passenger will send an execute command to the wake-up user interface, which is received in block B450. In response, in block B452, the media device executes the default user interface. In one aspect, the default user interface comprises a startup sequence and a menu that enables a passenger to select media to interact with. In other aspects, the default user interface will comprise a saved state that is saved on a memory of the media device, such as a paused movie or a map of the vehicle's journey.

Figure 4E:
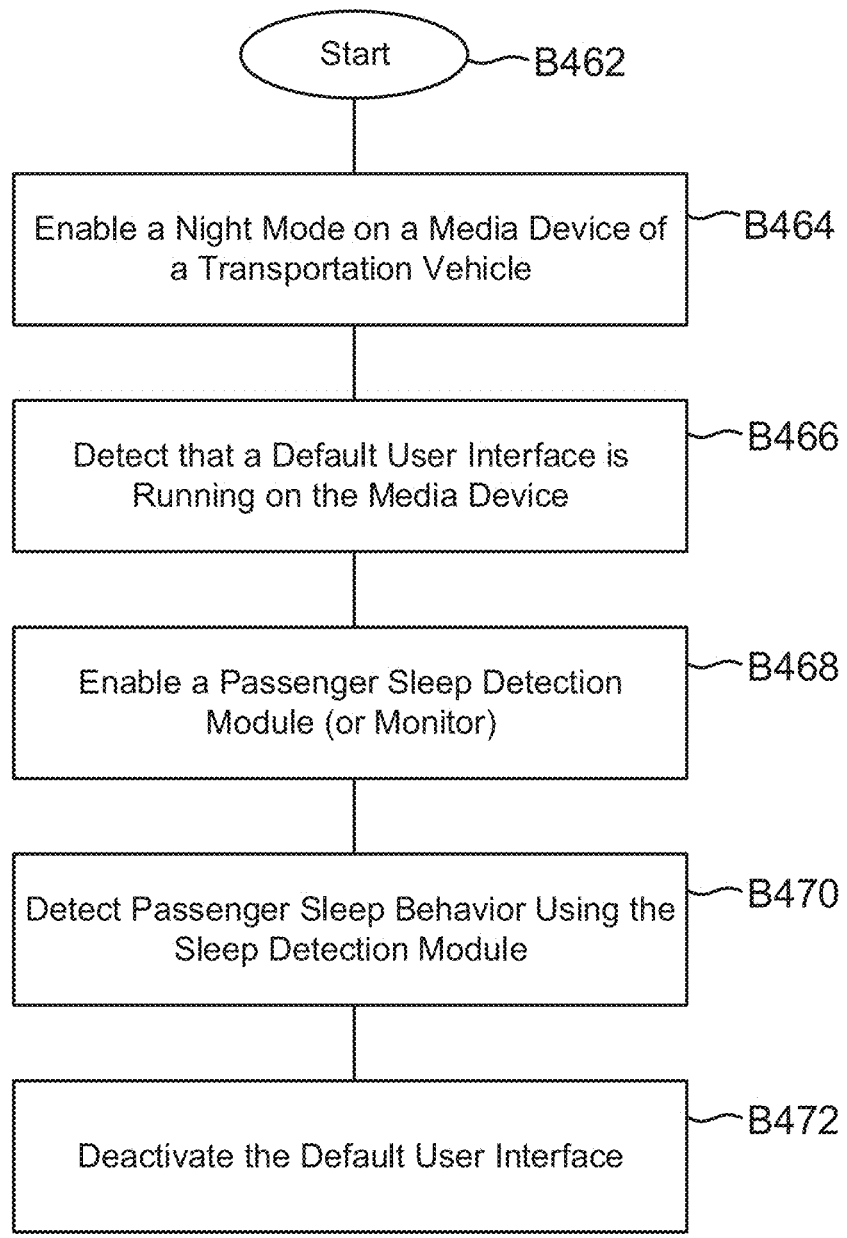
FIG. 4E shows another process flow diagram for multi-mode media system in the night mode, according to another aspect of the present disclosure.

FIG. 4E shows a process 460, according to another aspect of the present disclosure. Although the process blocks of process 460 are described with respect to an aircraft, the innovative technology enabling the process blocks may be implemented on any transportation vehicle type. In this process, the media device in question is powered on and in use. The process begins in block B462.

In block B464, night mode for an aircraft is enabled, for example, by receiving a night mode command from an airplane crew terminal interface, a switch intercept interface, an ambient light sensor interface, or a sleep analytics interface (e.g. sleep monitor 373). The night mode command is transmitted to a media device, which is then set to a night mode, preferably using a night mode indicator 371.

In block B466, the media device detects that the default user interface is being executed, and in block B468, the media device enables a sleep monitor 373 on the media device.

In block B470, the sleep monitor 373 detects passenger sleep behavior, and deactivates the default user interface in block B472, when a defined sleep condition is detected.

In some aspects, the sleep monitor 373 is configured to deactivate the default user interface when one set of sleep conditions are detected in one state, and deactivate the default user interface when another set of sleep conditions are detected in another state. For example, when the default user interface is playing a movie (i.e. a play movie state), the sleep monitor 373 may be configured to only deactivate the default user interface when it detects a passenger leaving a seat or when it detects a passenger falling asleep (e.g. detected by monitoring passenger eye, passenger eyelid behavior and detecting change in passenger head position). However, when the default user interface is displaying a map or a menu, the sleep monitor 373 may be configured to deactivate the default user interface when it detects a passenger leaving a seat, when it detects a passenger falling asleep, or when it fails to receive an input from the passenger within a threshold period of time.

In one aspect, methods and systems are provided for a transportation vehicle. One method includes enabling by a processor, a night mode for a seat device of an IFE system on an aircraft based on a night mode trigger; displaying by the processor, during the night mode, a wake-up user interface on the seat device for a passenger, when a seat device monitor backlight has turned on after the backlight was turned off, or a seat device backlight timer has triggered, where a brightness of the wake-up user interface is lower than a brightness of a default user interface of the seat device; and enabling by the processor a first set of functions of the seat device accessible from the wake-up user interface, the first set of functions being less than a second set of functions accessible from the default user-interface.

In another aspect, a method includes activating by a processor, a default mode for a media device of a transportation vehicle in response to receiving a wake command, and a night mode for the media device in response to receiving a sleep command; launching by the processor, a default user interface on the media device upon receipt of a power-up command to power-up the media device, when the media device is in the default mode, and a wake-up user interface, when the media device is in the night mode. The wake-up user interface enables a subset of functions of the default interface on the media device. The method further includes executing by the processor, the default user interface on the media device upon receipt of an execute command by the wake-up user interface.

Figure 5:
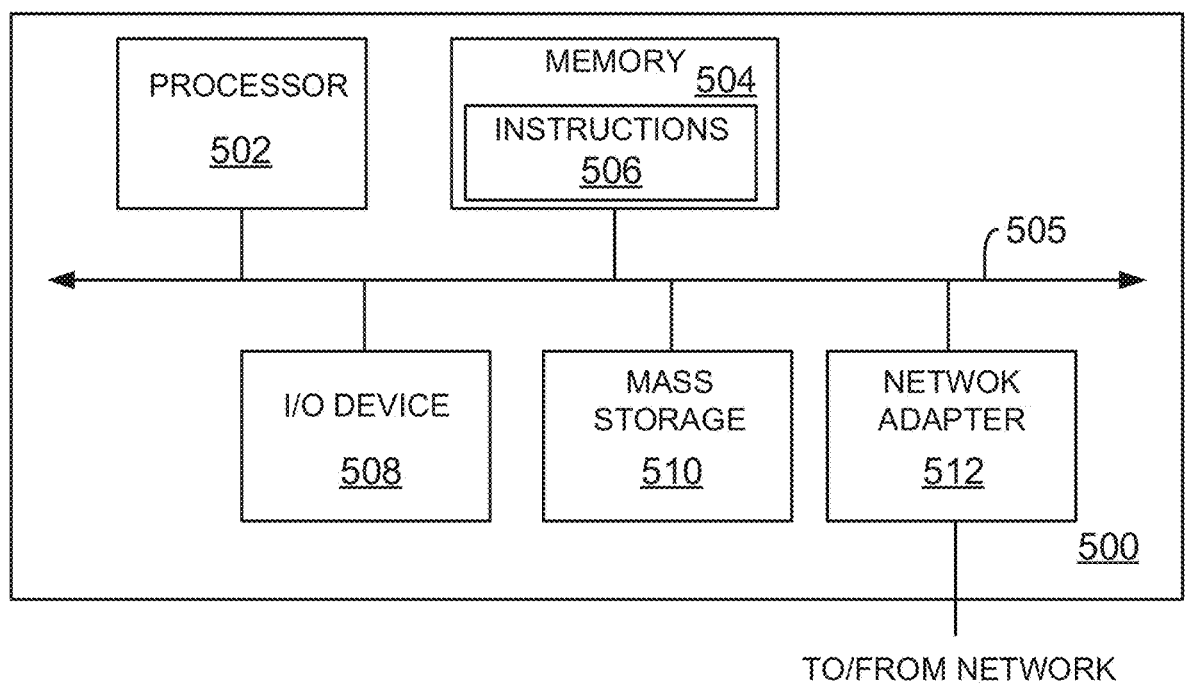
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent any computer system disclosed herein, for example, terrestrial content source 116, satellite communication system 122, computer system 106, media server system 112, user interface system 114, WAP 130, server 354, CMD 360, PED 302, seat device 326 or any user device that attempts to interface with a vehicle computing device. Note that certain standards and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement modules 382 and 386, application 314, data structure 320 and/or the process blocks of FIGS. 4A-4E described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for utilizing multi-mode media systems have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    enabling by a processor, a night mode for a seat device of an in-flight entertainment system (IFE) on an aircraft based on a night mode trigger;
    displaying by the processor, during the night mode, a wake-up user interface on the seat device for a passenger, when a seat device monitor backlight has turned on after the backlight was turned off, or a seat device backlight timer has triggered;
    wherein a brightness of the wake-up user interface is lower than a brightness of a default user interface of the seat device; and
    enabling by the processor a first set of functions of the seat device accessible from the wake-up user interface, the first set of functions being less than a second set of functions accessible from the default user-interface.

2. The method of claim 1, wherein the brightness of the wake-up user interface is configurable by the passenger between 0 to 75% of available brightness of the seat device.

3. The method of claim 1, wherein the first set of functions provide an option to turn on and turn off an attendant call light from the wake-up user interface.

4. The method of claim 1, wherein the first set of functions comprises an option to turn on and turn off an overhead light at a passenger seat from the wake-up user interface, turn off a backlight from the wake-up user interface, order one or both of food and drink from the wake-up user interface and provide flight information from the wake-up user interface.

5. The method of claim 1, wherein the night mode is triggered by a command executed from a crew member interface provided on a crew member device.

6. The method of claim 1, wherein the night mode is triggered based on a cabin control message indicating cabin lights have been dimmed or turned off.

7. The method of claim 1, wherein the night mode is triggered based on a seatback ambient light sensor detecting that cabin lights have been dimmed or turned off.

8. The method of claim 1, wherein the night mode is triggered by detecting that a passenger is asleep based on tracking passenger eye, passenger eyelid behavior and passenger head position by a seat device camera.

9. A method, comprising:
    activating by a processor, a default mode for a media device of a transportation vehicle in response to receiving a wake command, and a night mode for the media device in response to receiving a sleep command;
    launching by the processor, a default user interface on the media device upon receipt of a power-up command to power-up the media device, when the media device is in the default mode, and a wake-up user interface, when the media device is in the night mode; wherein the wake-up user interface enables a subset of functions of the default interface on the media device; and
    executing by the processor, the default user interface on the media device upon receipt of an execute command by the wake-up user interface.

10. The method of claim 9, wherein the sleep command is received from at least one of:
    a crew terminal interface;
    a switch intercept interface; and
    an ambient light sensor interface.

11. The method of claim 9, further comprising:
    receiving by the processor, image data from a camera directed at a passenger on the transportation vehicle;
    identifying by the processor, passenger sleep behavior from the image data; and
    generating by the processor, the sleep command based on the identified passenger sleep behavior.

12. The method of claim 9, wherein the wake-up user interface comprises a lower brightness level than a brightness level of the default user interface.

13. The method of claim 9, wherein a screen of the media device is deactivated by the processor for the night mode, when a threshold period of inactivity of a passenger of the transportation vehicle is detected by the media device.

14. The method of claim 9, wherein the media device saves a state of the media device in a memory upon detecting a threshold period of inactivity of a passenger of the transportation vehicle.

15. A non-transitory machine-readable medium having stored thereon instructions for performing a method, comprising machine executable code which, when executed by a machine, causes the machine to:
    activate a default mode for a media device of a transportation vehicle, in response to receiving a wake command, and a night mode for the media device in response to receiving a sleep command;
    launch a default user interface on the media device upon receipt of a power-up command to power-up the media device, when the media device is in the default mode, and a wake up user interface, when the media device is in the night mode; wherein the wake-up user interface enables a subset of functions of the default interface on the media device; and
    execute the default user interface on the media device upon receipt of an execute command by the wake-up user interface.

16. The storage medium of claim 15, wherein the wake-up user interface is configured to receive a command to request an attendant from a passenger of the transportation vehicle and transmit a notification comprising a unique identifier of the passenger to an attendant device.

17. The storage medium of claim 15, wherein the wake-up user interface presents functionality of the media device based on stored passenger profile of a passenger of the transportation vehicle.

18. The storage medium of claim 15, wherein a passenger of the transportation vehicle is monitored using a sensor of the media device; and a screen of the media device is shut down, when the sensor detects a sleep condition of the passenger and when the night mode is activated.

19. The storage medium of claim 15, wherein the wake-up user interface comprises a lower brightness level than a brightness level of the default user interface.

20. The storage medium of claim 15, wherein a state of the media device is saved in a memory upon detecting a threshold period of inactivity of a passenger of the transportation vehicle.

* * * * *